United States Patent
Farris et al.

(12) 
(10) Patent No.: US 6,504,907 B1
(45) Date of Patent: *Jan. 7, 2003

(54) CALL DETAIL REPORTING FOR LAWFUL SURVEILLANCE

(75) Inventors: Robert D. Farris, Sterling, VA (US); Dale L. Bartholomew, Vienna, VA (US); Raymond F. Albers, Vienna, VA (US); Charles H. Eppert, III, Fairfax, VA (US); Barry Pershan, Olney, MD (US); Daniel C. Michaelis, Ellicott City, MD (US); Michael G. Pilkerton, Fairfax, VA (US); Christine W. Huff, Vienna, VA (US); Jay C. Lodsun, Vienna, VA (US); Walter Pomykacz, Pine Hill, NJ (US); Thomas A. Nolting, Holliston, MA (US)

(73) Assignee: Verizon Services Corp., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/808,179

(22) Filed: Mar. 15, 2001

Related U.S. Application Data

(63) Continuation of application No. 09/270,071, filed on Mar. 16, 1999, now Pat. No. 6,233,313, which is a continuation-in-part of application No. 09/048,102, filed on Mar. 26, 1998, and a continuation-in-part of application No. 09/112,155, filed on Jul. 9, 1998.

(51) Int. Cl.[7] .......................... H04M 1/24; H04M 3/08; H04M 3/22
(52) U.S. Cl. .............................. 379/35; 379/7; 379/126; 379/243
(58) Field of Search .......................... 379/7, 32.01, 35, 379/111, 219, 220–221, 229–230, 126, 127.01, 133–134, 243

(56) References Cited

U.S. PATENT DOCUMENTS 5,012,511 A 4/1991 Hanle et al.

(List continued on next page.)

OTHER PUBLICATIONS

Lucent Technologies. "Local Number Portability," p. 1–2 (May 28, 1998).

(List continued on next page.)

*Primary Examiner*—Duc Nguyen
(74) *Attorney, Agent, or Firm*—Leonard C. Suchyta; Loren C. Swingle

(57) ABSTRACT

A lawfully authorized electronic surveillance operation requires reporting of detailed call data for a variety of calls associated with the subject of the surveillance. For at least some specified calls to or from the subject, the invention provides profile data in a switching office serving the subject that causes the office to generate accounting messages for each call, essentially in the same manner as for billing, regardless of whether the calls are billable. Accounting records formed from the messages are uploaded to a server system, for processing and formatting as necessary for delivery to the law enforcement agency. The surveillance could entirely rely on these accounting records for the data reporting. In the preferred embodiments, however, the surveillance also involves monitoring of common channel signaling messages to accumulate call detail records for surveillance purposes, with respect to many calls associated with the subject. The preferred embodiment utilizes a special CLASS code set against the subject's profile in the serving end office. The CLASS code in the profile causes that office to produce the accounting messages for each of the subject's calls processed through the office that does not involve a monitored form of interoffice signaling.

22 Claims, 4 Drawing Sheets

U.S. PATENT DOCUMENTS

| | | | |
|---|---|---|---|
| 5,241,588 A | | 8/1993 | Babson, III et al. |
| 5,247,571 A | | 9/1993 | Kay et al. |
| 5,475,732 A | | 12/1995 | Pester, III |
| 5,563,930 A | | 10/1996 | Pester, III |
| 5,572,583 A | | 11/1996 | Wheeler, Jr. et al. |
| 5,592,530 A | | 1/1997 | Brockman et al. |
| 5,687,212 A | | 11/1997 | Kinser, Jr. et al. |
| 5,715,294 A | | 2/1998 | Pester, III |
| 5,774,530 A | | 6/1998 | Montgomery et al. |
| 5,793,839 A | | 8/1998 | Farris et al. |
| 5,802,145 A | | 9/1998 | Farris et al. |
| 5,809,120 A | | 9/1998 | Montgomery |
| 5,854,835 A | | 12/1998 | Montgomery |
| 5,881,132 A | * | 3/1999 | O'Brien et al. |
| 5,950,121 A | * | 9/1999 | Kaminsky et al. |
| 5,999,604 A | * | 12/1999 | Walter |
| 6,097,798 A | | 8/2000 | Albers et al. |
| 6,199,047 B1 | * | 3/2001 | Dimino et al. |
| 6,233,313 B1 | * | 5/2001 | Farris et al. |

OTHER PUBLICATIONS

Nortel. "Number Portability –LNP Background," p. 1–4 (May 28, 1998).

"Midwest Region: Primer for Local Number Portability," Issue 2, p. 1–31 (May 28, 1998).

Nortel. "Local Number Portability: LNP Backgrounder," p. 1–4 (May 28, 1998).

Ovum. "Number Portability: Strategies for Market, Technical and Regulatory Success," p. 1–3 (May 28, 1998).

Siemens Telecom Networks. "Topic 1: Siemens Telecom Networks: Local Number Portability: Introduction," p. 1–3 (Apr. 2, 1998).

Siemens Telecom Networks. "Topic 4: Siemens Telecom Networks: Local Number Portability: Number Administration and Call Routing in Today's Network," p. 1 (Apr. 2, 1998).

Siemens Telecom Networks. "Topic 5: Siemens Telecom Networks: Local Number Portability: Tomorrow's Network—the Location Routing–Number Architecture," p. 1–4 (Apr. 2, 1998).

"Number Portability News and Links," p. 1–7 (May 28, 1998).

Lucent Technologies. "Number Portability Technical Documents," p. 1–2 (May 28, 1998).

USTA. "Local Number Portability (LNP): Overview of LNP," p. 1 (Apr. 2, 1998).

* cited by examiner

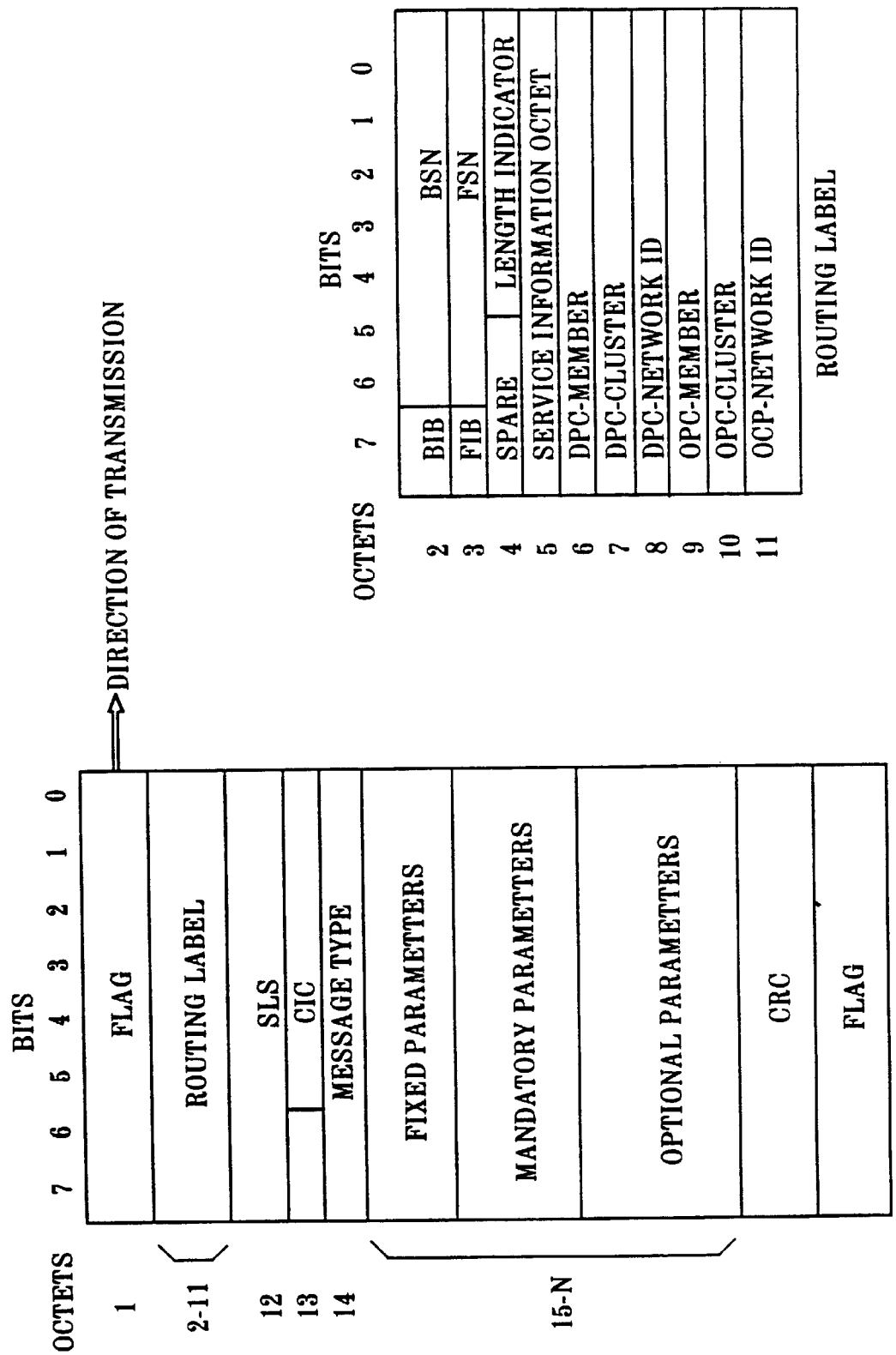

ID

CALL DETAIL REPORTING FOR LAWFUL SURVEILLANCE

CROSS-REFERENCE TO RELATED APPLICATIONS

This application is a Continuation of application Ser. No. 09/270,071 filed Mar. 16, 1999 now U.S. Pat. No. 6,233,313.

This application is a continuation-in-part of U.S. patent application Ser. No. 09/048,102 filed on Mar. 26, 1998 entitled NETWORK PLANNING TRAFFIC MEASUREMENT PROGRAM, the disclosure of which is entirely incorporated herein by reference.

This application also is a continuation-in-part of U.S. patent application Ser. No. 09/112,155 filed on Jul. 9, 1998 entitled MONITOR NETWORK WITH ADVANCED INTELLIGENT NETWORK (AIN) FOR ELECTRONIC SURVEILLANCE, the disclosure of which is entirely incorporated herein by reference.

TECHNICAL FIELD

The present invention relates to methods and systems for analyzing call specific data records for traffic through a telecommunication network in order to record detailed traffic information regarding specifically identified subjects of lawfully authorized electronic surveillance.

Acronyms

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
American National Standards Institute (ANSI)
ANswer Message (ANM)
Automatic Message Accounting (AMA)
AMA Transmitter (AMAT)
BellCore AMA Format (BAF)
Carrier Access Billing System (CABS)
Call Detail Record (CDR)
Carrier Identification Code (CIC)
Central Office (CO)
Central Office Terminal (COT)
Competitive Local Exchange Carrier (CLEC)
Common Channel Signaling (CCS)
Communications for Assistance of Law Enforcement Act (CALEA)
Customer Record Information System (CRIS)
Custom Local Area Signaling Service (CLASS)
Cyclic Redundancy Code (CRC)
Destination Point Code (DPC)
Digital Loop Carrier (DLC)
End Office (EO)
Federal Bureau of Investigation (FBI)
Global Title Translation (GTT)
Identification (ID)
Initial Address Message (IAM)
Input/Output (I/O)
Integrated Services Digital Network (ISDN)
Inter-exchange Carrier (IXC)
Internet Service Provider (ISP)
ISDN User Part (ISDN-UP or ISUP)
Law Enforcement Agency (LEA)
Lawfully Authorized Electronic Surveillance Protocol (LAESP)
Line Identification Data Base (LIDB)
Local Access Transport Area (LATA)
Local Exchange Carrier (LEC)
Message Processing Server (MPS)
Message Signaling Unit (MSU)
Message Transfer Part (MTP)
Origination Point Code (OPC)
Operations, Maintenance Application Part (OMAP)
Personal Computer (PC)
Plain Old Telephone Service (POTS)
Public Switched Telephone Network (PSTN)
Release Complete Message (RLC)
Release Message (REL)
Remote Terminal (RT)
Revenue Accounting Office (RAO)
Service Control Point (SCP)
Service Switching Point (SSP)
Signaling Link Selection (SLC)
Signaling System 7 (SS7)
Signaling Point (SP)
Signaling Transfer Point (STP)
SubSystem Number (SSN)
SUSpend (SUS) Message
Telecommunications Industry Association (TIA)
Time Slot Interchange (TSI)
Transaction Capabilities Applications Part (TCAP)
Wide Area Network (WAN)

BACKGROUND ART

Historically in the United States authorities such as city, state, or federal police authorities, may legally engage in electronic surveillance (frequently referred to in the vernacular as wire-tapping), when duly authorized to perform such an activity by a cognizant judicial authority. Such surveillance may include delivery of call related signaling data to the authority or delivery of both signaling data and actual content of communications to and from the subject of the surveillance.

In earlier times, when public telephone service was virtually all analog, the procedures were relatively simple. Assuming surveillance of a residence connected to the telephone network by a local loop consisting of a pair of copper wires, the usual practice was to locate a convenient cross connect and bridge on to the two wire analog circuit. The entity conducting the surveillance then engaged the serving telephone network operator or company to provide a circuit from that location to the law enforcement location. The law enforcement organization could then monitor the conversations, generally referred to as content, as well as the call set up and related signaling.

Statistically approximately 90 percent of the authorized surveillance in the United States does not cover content but only signaling data. Signaling data surveillance is performed through a Pen register tap. A pen register is a dialed number recorder. The register includes a dial pulse detector and/or a dual tone multi-frequency decoder, connected to the line serving the subject party. A memory or recording device captures detected dialing information. However, this register accumulates only dialing information and only that for the connected line.

With the widespread use of digital communication and control signaling, the simplicity and ease of the prior surveillance procedures has largely disappeared. As a result, law enforcement agencies, and cooperating Public Switched Telephone Network (PSTN) carriers, are forced to cope with a considerably more complex and costly substitute set of procedures. Partially in response to this situation Congress passed Public Law 103-414, the Communications Assistance for Law Enforcement Act (CALEA). The Telecommunications Industry Association (TIA), accredited by the American National Standards Institute (ANSI), was selected by the telecommunications industry to promulgate the industry's CALEA standard. The TIA promptly initiated a standards program. Initial disagreements within industry were resolved, and TR45 Lawfully Authorized Electronic Surveillance SP-3580, Baseline Revision 10 was produced. The baseline requirements specified in this standard have become known as the "safe harbor" standards, pending resolution of still outstanding differences with respect to certain preferences of the Federal Bureau of Investigation (FBI).

The CALEA specifications include a requirement that the subject under surveillance continue to receive all subscribed enhanced, CLASS, and other services. The surveillance must be completely transparent, to the subject and to other parties communicating with the subject. The central office switches currently in use in the public switched telephone networks were not designed with CALEA functions in mind. As a result it is not surprising that many existing switches can not be easily adapted to meet major CALEA requirements.

The basic surveillance problem has undergone continued evolution as telecommunications technology has advanced and provided the public with, an ever-increasing variety of services. Illustrative of such services, which create added complexity for effective telephone surveillance, is call forwarding or redirection, call conferencing, call waiting, bill to third party calling, etc. Another example is central office based speed dialing.

Since the proposed CALEA requirements are worded in terms of service, i.e., monitoring the telephone service (signaling and speech) of the subject, and anything that can be accomplished with the service, significant problems are presented by such enhanced network services. This becomes particularly acute when coupled with a desire that the surveillance capability should be almost universally applicable to all telephone central offices, including end offices that rely on legacy switches.

Of particular note, the new CALEA standards impose a significantly increased requirement for delivery of signaling data regarding communications associated with the subject of the surveillance. The call associated information must include the signaling data relating to the subject party as well as any other parties to the call. The information must also include a variety of other data, for example relating to called party and calling party identities, relating to call redirection, relating to interexchange carrier identity, and the like. The law requires delivery of call related signaling data for subjects under content surveillance, although the signaling data may be delivered separately from the content delivery. Also, many surveillance operations will continue to involve delivery of only the call associated signaling data.

It has been suggested that the carriers implement the CALEA standard, both for content and call data delivery, by deploying specialized surveillance equipment in offices of the carriers' networks. Deployment of such equipment or other forms of office upgrades in a large number of offices, to satisfy the surveillance requirements, will require a large capital investment. Processing of calls through such specialized equipment raises questions of whether or not the surveillance might be detectable by the target. It has been suggested that, for subjects served from offices not complying with CALEA, the subjects calls could be routed and processed for surveillance through an office having full CALEA compliant capabilities. Many approaches to such routing would be detectable by the subject or parties in communication with the subject.

As described for example in parent application Ser. No. 09/112,155, Applicants have developed solutions, which make the services entirely transparent while processing calls through a CLEA compliant office. The routing to the CALEA compliant office is effective in some situations, particularly where content delivery is required. However, even this approach imposes some costs, for increased inter-office routing and/or for specialized routing control from a service control point or the line. Also, if CALEA compliant equipment in an office is necessary for every surveillance, even for data only surveillance, it forces the carrier to upgrade more offices to insure capacity to handle all expected surveillances.

A need still exists for a cost-effective mechanism to provide the desired level of surveillance, in the modern telecommunications world, while maintaining secrecy of the surveillance, particularly with respect to signaling data delivery.

The telecommunication networks today utilize a wide range of signaling messages and data recording systems, to control set-up and tear down of calls, to record billing information, and the like. Deployment of new equipment to record signaling data for surveillance purposes adds another layer of expense and complexity to operation and maintenance of the telecommunication switching offices.

A specific need therefore exists for a cost-effective technique for accumulating the call signaling data for surveillance purposes. To meet this specific need, any solution should minimize the requirements for installation of new hardware, particularly hardware at the individual office level. Any new hardware for the surveillance should be as centralized as possible, yet provide the requisite data for subjects served through many local offices. Also, it is desired that the surveillance technique impose no new processing steps, during routing of the call, to insure transparency to the subjects.

It is accordingly an object of the present invention to provide a relatively straightforward and cost-effective solution to the foregoing problems of signaling data delivery for lawfully authorized electronic surveillance.

DISCLOSURE OF THE INVENTION

The invention addresses the above stated needs by providing effective techniques for accumulating and delivering call associated signaling data for lawful surveillance from standard management data messages normally used by the network. Management data here refers to information generated by the telecommunication network for its operations purposes. In particular, the inventive surveillance technique utilizes a form of accounting messages, normally sent from central offices of the network to an accounting office, for record keeping and billing purposes. An office serving the subject, however, is programmed to generate the messages for a specified set of calls to facilitate the surveillance, regardless of whether or not each of these calls is billable. Another example of such data would be common channel signaling messages generated to control call set-up and tear-down of interoffice calls and the like. The preferred embodiments utilize both types of messages, to provide complete call associated data for the surveillance in a cost effective manner with a minimum processing burden on the actual call processing elements of the network.

The present invention encompasses methods for conducting surveillance. Other aspects of the invention relate to a telecommunication network implementing the inventive surveillance techniques. The invention also relates to a system, for use in a telephone network, for conducting the call associated data surveillance.

Thus, a first aspect of the invention relates to a method of conducting lawful call associated data surveillance in a switched telecommunication network. During processing of a call in some way associated with a subject of the surveillance, the method entails detecting a code in a service profile for the subject. The profile is stored in a switching office of the network involved in processing of the call. Upon detecting the code, the switching office generates accounting messages containing data regarding events occurring in processing of the call. The accounting messages are processed to form a detailed record of the call. The detailed record includes significant data associated with the call. A data system of a law enforcement agency receives the detailed record of the call.

The code in the profile preferably causes the switching office to generate the accounting messages for a predetermined set or class of calls. The calls in the predetermined set include both completed and uncompleted calls. The set of calls also may include calls that enable the subject to control special service features offered by the telecommunication network. One example of such a control-related call would be a call to activate forwarding of calls for the subject's telephone number to another telephone number. While active, the switching office would continue to generate accounting messages, in this example, relating to forwarded calls.

The inventive surveillance may deliver the detailed record, in essentially raw form, to the law enforcement agency. However, one feature of the invention is that the carrier may provide enhanced data, if the agency desires. For this purpose, the processing of the messages to form the detailed record may include translating information from one or more of the accounting messages into corresponding descriptive textual information. In this way, the carrier can provide the agency with name and possibly address information for one or more parties to a call. The translation may convert a carrier identification code, such as that for an interexchange carrier, into the name of the carrier. The translation also may add a description of any special service features involved in processing of the call.

In the preferred embodiment, the switching office transmits the accounting messages to an accounting office, which normally processes such messages for accounting purposes. For the surveillance operation, the accounting office compiles a record, typically in the form of a complete set of the data from the messages for each call associated with the subject. The accounting office adds an identifier of the particular surveillance operation and forwards the complete message set to a server. The server performs additional processing, such as the above-described translations. The server also formats the call record, as needed, to satisfy the protocol requirements of the particular agency and/or the CALEA standard. The server transmits the enhanced and formatted record of the call over a data link to a processing system of the authorized law enforcement agency.

As noted, the preferred embodiments actually utilize both the accounting message processing and common channel signaling messages. Thus, another aspect of the invention relates to a method of conducting lawful call associated data surveillance on calls processed through a telecommunication network comprising a plurality of interconnected switching offices and a common channel signaling network for interoffice signaling. This method involves monitoring messages transported on links of the common channel signaling network, to capture signaling messages relating to network processing of a first group of calls associated with the subject. The first group of calls essentially relates to calls that involve the monitored common channel signaling. The captured messages are processed to form a call detail record of each of the first group of calls associated with the subject. This method invention also entails processing a second group of calls associated with the subject through one of the switching offices. The calls in the second group are calls that do not involve the monitored interoffice signaling. The switching office generates accounting messages regarding events in processing of each call in the second group. The accounting messages are processed to form a detailed record of each call in the second group. This method delivers both the call detail records for the first group of calls and the detailed records for the second group of calls to a data system of the law enforcement agency.

Although applicable to other networks, the preferred embodiments facilitate surveillance in a telephone network, such as that of a local exchange carrier or a cellular carrier. In such an application of the invention, the monitored common channel signaling messages are signaling system seven (SS7) messages. The accounting messages are automatic message accounting (AMA) messages. Monitors on the SS7 links capture signaling messages relating to interoffice calls and some other calls that involve interoffice signaling, e.g. calls to manipulate control data stored in a central database. The programming in the switching office causes that office to generate AMA messages for all calls that do not involve the monitored SS7 signaling. Typically, these calls are intra-office calls or interoffice calls through offices using in-band signaling instead of the SS7 common channel signaling.

Another aspect of the invention relates specifically to a surveillance system. The surveillance system accumulates call associated data for surveillance of a subject's communications through a telephone network. The surveillance system includes monitors coupled to common channel signaling links of the network, for monitoring interoffice signaling messages. A common channel signaling processor, in communication with the monitors, processes monitored messages to compile call detail records for a group of calls associated with the subject that involve interoffice signaling. This surveillance system also encompasses software in one of the switching systems of the network that provides service to the subject. The software causes the switching system to generate accounting messages regarding events in processing of a set of calls. The calls in this set of calls are calls that do not involve interoffice signaling messages detectable by the monitors. A server receives and processes the call detail records from the common channel signaling processor. The server also receives and processes detailed records for the set of calls, derived from the accounting messages. From these various records, the server produces surveillance records and supplies the surveillance records to a data processing system of a law enforcement agency.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

FIG. 3 illustrates in graphic form the layout of an SS7 message.

FIG. 4 graphically depicts the layout of the routing label portion of the SS7 message of FIG. 3.

DETAILED DESCRIPTION OF THE PREFERRED EMBODIMENTS

Figure 1:
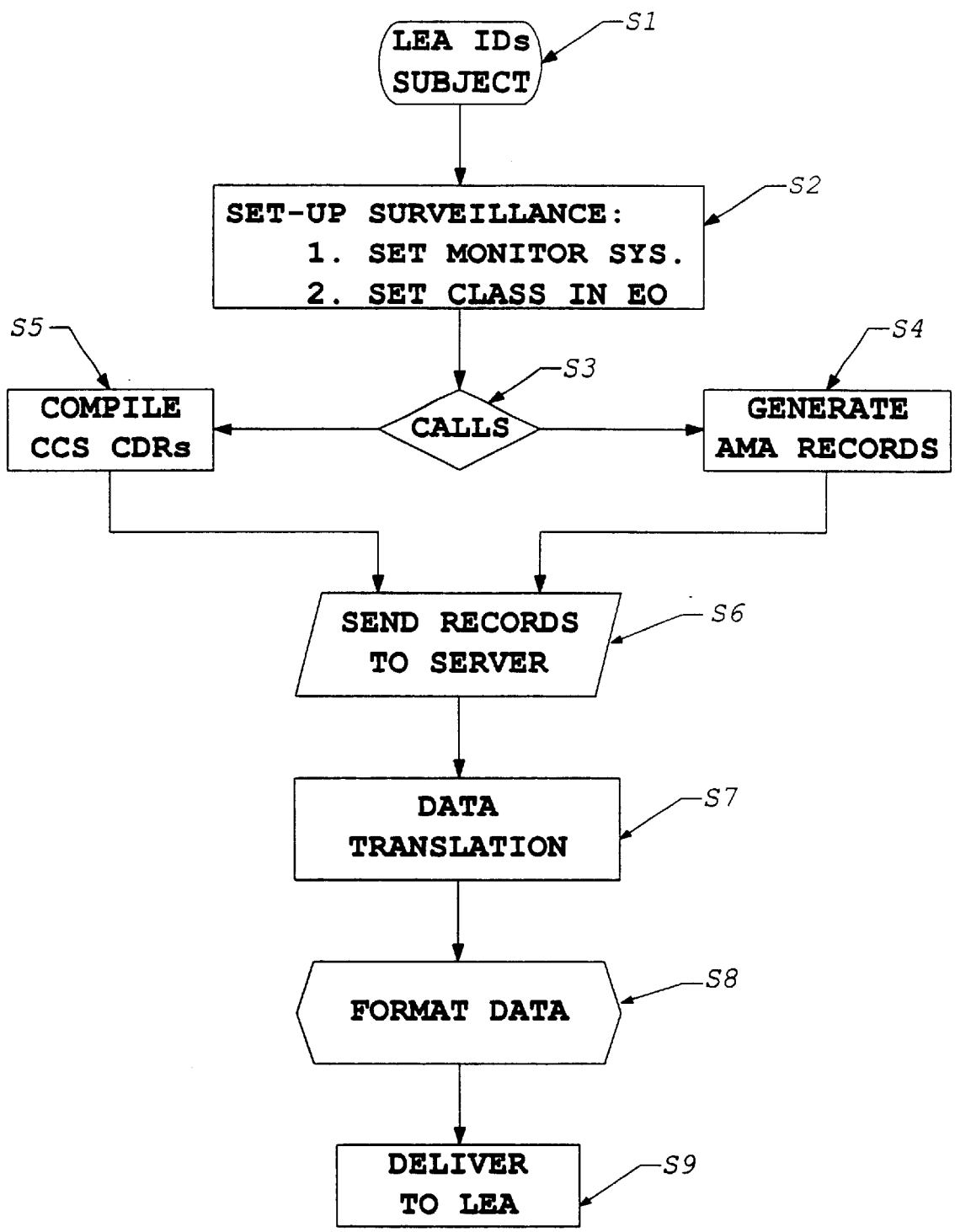
FIG. 1 is a simplified flow chart useful in explaining the high-level concepts involved in call-related data surveillance, using interoffice signaling and accounting messages, in accord with the present invention.

The invention involves compiling and processing call associated data, relating to any and all calls in some way linked to a line or station user that is the subject of a lawfully authorized surveillance. For at least some specified type of calls to or from the subject, profile data in the office serving the subject causes the office to generate standard accounting messages for events in processing of each call. The office generates these messages essentially in the same manner as if the calls were billable. Accounting records formed from these messages are uploaded to a server system, for processing and formatting as necessary for delivery to the law enforcement agency.

The accounting message generation and transmission is an existing function of end office switches of the public switched telephone network. In such a network, use of these messages to create records for surveillance purposes does not require installation of any new equipment in the offices. This surveillance technique requires only a minor software change to define a class of service and the setting of a CLASS code with respect to a subject line or station targeted for surveillance.

The actual processing of a call, to route the call through the office, does not change. The processor of the switch routinely generates the accounting messages as it processes the call, exactly the same as if the call were billable. If the switch would generate the messages for other reasons, e.g. for some special billing purpose, the switch only adds an identifier to indicate that the message also relates to surveillance. Clearly, this messaging operation adds little or no extra burden on the switch. Also, since there are no unique processing steps, routing is entirely normal and fully transparent to the subject and parties communicating with the subject.

Custom Local Area Signaling Services or "CLASS" services are number-translation services available within a local exchange or switching office. The switch provides the CLASS service to a subscriber upon detection of a corresponding CLASS code in the subscriber's profile. Examples of common CLASS services available today include call-forwarding, automatic callback, call-waiting and distinctive ringing. Not all CLASS codes currently are in use. In accord with the preferred form of the invention, the switching systems of the network are programmed to recognize one of the previously unused CLASS codes as a designation for the call associated data surveillance service.

The accounting messages could provide call detail information for all calls to and from a subject of surveillance. Such an approach, however, requires the office to generate a substantial number of additional messages in its accounting operations for the subject subscribers. The preferred embodiments utilize this approach, using only the accounting messages for the call data surveillance, only for subjects served by offices lacking common channel signaling capability.

In the preferred embodiments, the surveillance also involves capture of out-of-band interoffice signaling data. A system of monitors detects messages normally transmitted over out-of-band signaling links, to compile detailed records of each interoffice call involving the subject. This monitoring is a passive operation, from the perspective of the switching offices and the signaling network components. The switching offices and the transfer points in the signaling network need not perform any extra operations to generate or capture the signaling messages. Installation of the monitoring system may be necessary, but in many cases, the carrier may have already installed the monitoring system for other purposes, such as fraud detection and supervision of the signaling network.

The interoffice signaling alone would not provide call associated data for all calls that might involve the targeted line or station, at least without some modification of call processing and signaling operations. Some calls are intraoffice calls that do not normally generate any interoffice signaling. Also, the network may process some interoffice calls using signaling that may not pass one of the monitors for capture. The combination of monitoring the out-of-band interoffice signaling with recording accounting messages for all calls not requiring the out-of-band interoffice signaling enables efficient accumulation of records of essentially all calls involving the subject line or station.

The preferred embodiment therefore utilizes a special CLASS set against the subject's profile in the end office serving the subject. The CLASS code in the profile causes that office to produce accounting messages for events in processing of each call related to the subject that does not involve the monitored form of interoffice signaling. The office generates such messages for use in surveillance records, regardless of the result of the call. For example, the office generates messages for use in compiling an accounting record of completed and uncompleted call, regardless of whether or not the call is billable. The office also generates these messages on calls to control special service features, for example, when the subject dials a call forwarding activation or deactivation code.

The surveillance may require the installation of a new server system, for processing the data from the accounting records and the detailed records from the monitoring of the interoffice signaling. The server system, however, is a centralized resource that processes the surveillance data for subjects served through many offices. As such, installation and programming of the central server is a single cost spread over many surveillance operations throughout the carrier's region of operation.

As a prime example of the present invention, FIG. 1 depicts the high-level process flow of a method for conducting surveillance in accord with the present invention. From the carrier's perspective, the first step (S1) of the surveillance process (FIG. 1A) involves a communication from the law enforcement agency (LEA). The LEA identifies the subject targeted for the surveillance and provides an appropriate indication that the surveillance of the subject is lawfully authorized. The carrier then sets up the network elements for surveillance of the identified subject (S2).

The surveillance may involve delivery of content to the LEA; however, for purposes of our discussion, assume that the authorized surveillance involves only delivery of call associated signaling data. The preferred embodiment of the invention relies on monitoring of two or more different types of management data messages. Preferably, the network operator deploys a system to monitor out-of-band interoffice signaling messages. The network operator also programs the network switching offices and billing system to accumulate call detail records from messages normally sent to an accounting office for record keeping and billing purposes.

Set-up and tear-down of a call connection traversing two switching offices of the PSTN requires an exchange of various signaling information between the two switching offices. Some systems still utilize in-band signaling, within the voice channels on the interconnecting trunks. However, increasingly, the carriers utilize an out of band signaling technique commonly referred to as "Common Channel Interoffice Signaling") or "Common Channel Signaling" (CCS). The channels carrying the signaling messages are separate from the line and trunk channels carrying the switched subscribers' communication traffic. However, any one such channel is used in 'common' for signaling relating to many calls to and from different parties.

In the telephone network, the central offices generate automatic message accounting (AMA) records. Such records are used to provide call details to enable the local exchange carrier to bill for the completed calls, for example to bill the end users, to bill interexchange carriers (IXCs), to bill competing local exchange carriers (CLECs), etc. The AMA records may also provide call details for other network operations, e.g. for maintenance purposes.

In operation, a switch examines a customer's service request, typically the destination telephone number, and based on customer profile or service information determines if there is a need for AMA recording for the call. If so, the switch outputs AMA messages for significant events in processing of the call. The AMA messages are typically in the Bellcore AMA Format (BAF).

Both the common channel signaling (CCS) messages and the AMA messages provide considerable information regarding individual calls. Returning to FIG. 1, the set-up step S2 involves setting the system for monitoring the common channel interoffice signaling messages for calls in some way associated with the subject. Set-up also involves setting the appropriate CLASS in the subject's service profile in the end office (EO) serving the subject. Setting the CLASS causes the end office to generate AMA messages, for all calls associated with the subject that do not involve the monitored common channel interoffice signaling.

Once the carrier has set up the authorized surveillance, the network processes calls (S3). The calls include calls to and from the subject's line or station. As discussed more later, the calls processed at S3 may involve certain other call processing situations relying on or controlling specialized service features available in the network, such as call redirection or forwarding.

Certain calls processed through the network do not generate out-of-band interoffice signaling, for example, because the calls are intra-office or go to or from a terminal or office not having the out-of-band signaling capability. Because of the CLASS of service set in the subject's profile in the end office, the end office generates AMA messages for such calls. The end office sends those messages to a billing system, which compiles data from sets of messages relating to individual calls into call detail records (S4). The call detail records or "CDRs" generated from AMA messages contain all available data regarding each of the calls, such as called and calling party numbers, billing numbers, time of calls, duration of calls, and any special service features invoked during call processing.

For calls involving common channel signaling (CCS), the monitoring system captures the signaling messages and compiles data from the CCS messages to form the CDRs for those calls (S5). As with the CDRs formed from the AMA messages, the CCS CDRs contain all of the available data regarding the calls, including the various parties' numbers, the causes of release of the calls, any interexchange carrier involved in each of the calls, etc.

The formation of records in steps S4 and S5 produces a record for each and every call that the carrier's network processes for the subject under surveillance. The records are transferred to a server (S6) for further processing.

Depending on the information sought by the LEA, the carrier may enhance the data or deliver the data in its raw form. Assume for discussion, that the LEA requires the carrier to enhance the data. The server runs a program to perform the necessary processing. There may be a variety of enhancements desired by different law enforcement agencies, but the most common forms relate to different types of translations of the data.

The call detail information initially uploaded into the server contains considerable information, albeit in numerically coded form as utilized by the telephone network operations. The telephone company maintains a number of databases for its own purposes, regarding its customers, its equipment, etc. In step S7, the server accesses reference data available in the carrier's database(s) to translate raw data contained in the records into corresponding descriptive information. For example, the translation may add subscriber identification and address information to each telephone number (e.g. for the called, calling and/or billing parties) in each record. The server could obtain the information from a Line Identification Database (LIDB), the carrier's billing system, or the like. The translation would provide text information identifying any other carrier involved, for example an interexchange carrier (IXC) providing transport for a long distance call. The translation might also provide descriptors for any special service features invoked during processing of a call.

The CALEA standard specifies a format for the signaling data to be delivered to the LEA. The call detail records produced by monitoring the CCS messages and processing of the AMA messages are in standardized formats used by the telephone network. The data translation step (S7) adds descriptive information desired by the LEA, and in step 38, the server formats the data from the enhanced records as required to satisfy the CALEA standard and/or the particular LEA. In step S9, the server delivers the appropriately formatted data to the destination specified by the requesting LEA, typically to the LEA's data processing center.

Figure 2:
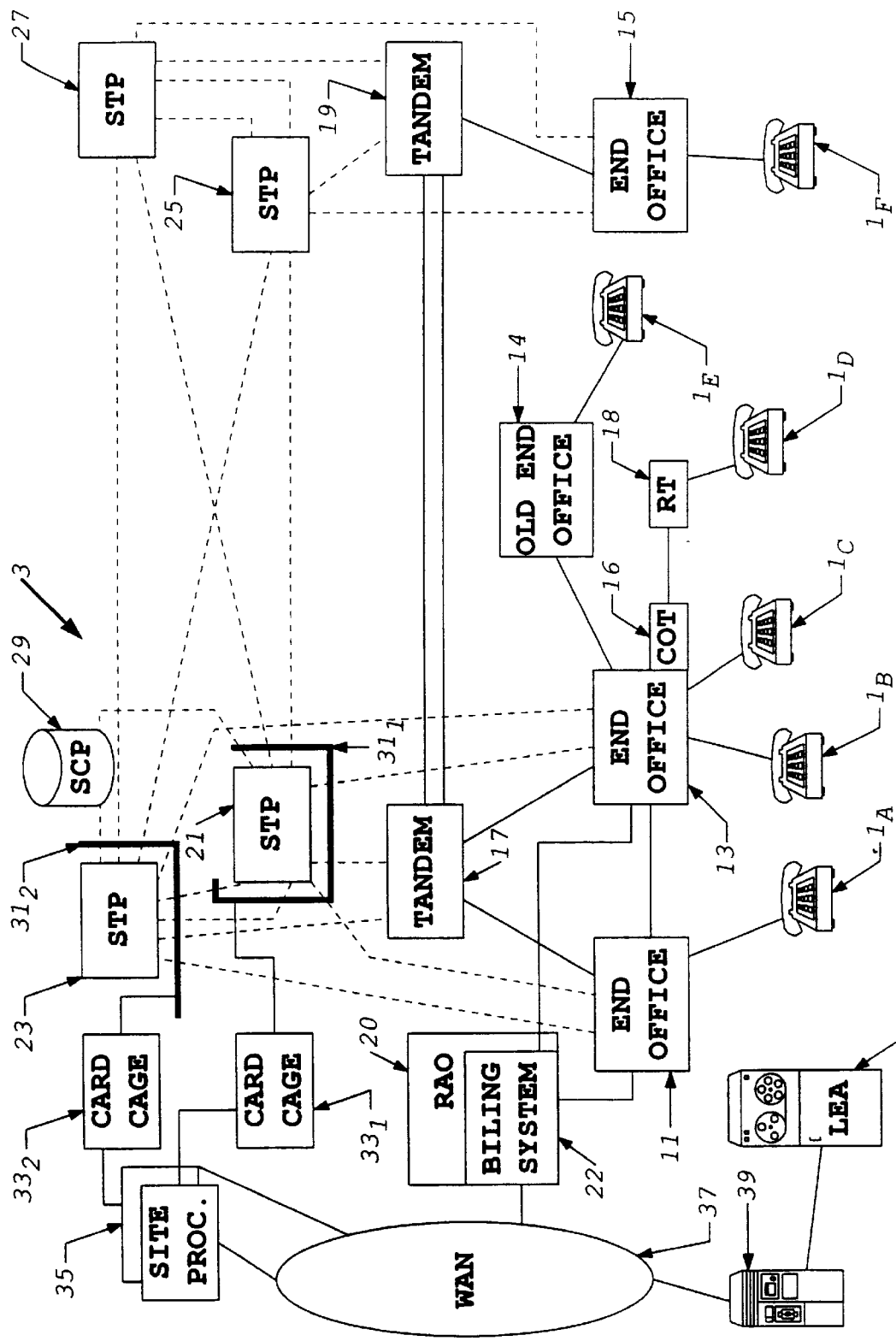
FIG. 2 is a block diagram illustration of a switched telephone network and elements of the inventive system used to capture call associated data from that network.

As shown by the discussion of FIG. 1, the inventive surveillance technique entails monitoring certain signaling within a telecommunication network and capture of certain accounting messages utilized by the network. The preferred embodiments of the invention apply to surveillance conducted in a wireless telephone network or a public switched telephone network, such as the network of a local exchange carrier. To better understand the invention, it may be helpful to consider the structure and operation of one such network and the application of the invention thereto, in somewhat more detail. Referring to FIG. 2 there is shown a block diagram of a public switched telephone network and the SS7 network that carries the call control signaling for the switched network.

Subscribers own and operate telephone station equipment 1 of various types. Examples of the station equipment 1 include analog and digital telephones, facsimile machines, computers equipped with modems or ISDN cards, and the like. The stations communicate through links to offices of the public network 3. The communication links typically comprise telephone lines, but other links such as wireless communications may be used.

For purposes of surveillance, a law enforcement agency (LEA) contacts one of the carriers that operate the network 3. The LEA and the carrier set up systems and procedures to enable the LEA to specify subjects of lawful surveillance and receive at least call associated data from the carrier's network. For this purpose, the LEA operates a data storage and processing system 7, for receiving the data from the network 3 over an appropriate data link.

The switched portion of telephone network 3 consists of a series of central office (CO) switches. Certain of these offices serve as end offices (EOs), providing switched telephone communication services to customers' telephone stations 1. FIG. 2 depicts several end offices at 11, 13 and 15, which connect to the interoffice signaling network. All calls traversing two or more offices are interoffice calls. If such calls extend through offices having common channel signaling capability, the offices exchange out-of-band signaling messages to facilitate set-up and tear-down of the requisite call connections.

As noted earlier, some older or smaller offices, such as end office 14, do not have common channel signaling capability. Calls between such an office and other offices of the network still require interoffice signaling, to control set-up and tear-down of connections via trunk circuits. The older offices, however, utilize various forms of signaling over the actual trunk links between the involved offices. For example, many offices still have the capability for dual tone multi-frequency signaling over a trunk channel, before allowing subscribers to conduct the actual communications over the channel.

The telephone network also includes a number of switching offices 17, 19, which serve as tandems for providing trunk connections between end offices, for example for overflow traffic when direct trunks between end offices become congested. The tandems also provide a point of interconnection between networks of different carriers. If the carriers utilize common channel signaling, the tandems usually have the capability for conducting interoffice signaling via the common channel signaling network.

Many subscribers' stations 1 connect through telephone lines or the like directly to one of the end office switches. However, in recent years, the local carriers have installed digital loop carrier (DLC) systems, to extend the area of service outward from individual end offices and to achieve pair gain in the local loop plant. A DLC system consists of a central office terminal (COT) 16 and a remote terminal (RT) interconnected by one or more high-speed, multi-channel links. Modern DLCs typically utilize optical fiber. With a DLC system, a station $1_D$ connects through a telephone line to the RT 18. The RT connects through the wideband link to the COT 16, which is coupled to an end office 13. The terminals selectively transport the communication signals for the station $1_D$ over the wideband link together with communications for other active terminals served through the DLC. The DLC terminals allocate channels on the wideband link, as individual subscribers make and receive calls. Typically, the carrier engineers the DLC system to serve more customers than there are channels on the high-speed link, since not all of the customers will actively use the system at the same time.

All subscribers served through the DLC essentially share the wideband link. To the individual subscriber, however, the DLC is transparent. It appears as if the station $1_D$ receives normal service directly from the end office 13. The host switch, in this case the end office 13, controls and accounts for all processing of calls through the subtending terminals of the DLC. Using a number of DLC systems as well as normal direct connections, one end office 13 may now serve several hundred thousand subscribers lines. As such, the intra-office area of the end office 13 may be quite large.

Various network elements, such as the end office switches 11, 13 and 15, and/or the tandems 17 sand 19 of the network 3, generate automatic message accounting (AMA) records. In operation, a switch examines a customer's service request, typically the destination telephone number, and based on customer profile or service information determines if there is a need for AMA recording for the call. If so, the switch outputs AMA messages for significant events in processing of the call. The AMA messages are typically in the Bellcore AMA Format (BAF).

The AMA messages from the switches go to a regional accounting office (RAO) 20 having to one or more billing systems 22. The messages may be transported to the RAO by physical transport of data tapes, but preferably, each of the switches has an AMA Transmitter (AMAT) or the like coupled to an appropriate data link to allow electronic communication of the messages to the RAO. Although shown separately, these data links may be logical links provided through a wide are network (WAN) 37.

In the RAO 20, the AMA data messages are edited and checked for integrity and supplied to the appropriate billing system 22. For this purpose, a message-processing server (MPS) assembles the various entries relating to an individual call into a completed message set. Any incomplete message sets are analyzed for administrative purposes and fraud detection. The complete message sets are loaded into the billing system 22.

For example, a billing system, which some carriers refer to as the Customer Record information System (CRIS), processes records for end user billing. The CRIS system calculates the monetary amount for each usage event, identifies the appropriate customer's billing account and posts the billable amount to that account. Another common example of a billing system is the Carrier Access Billing System (CABS), which local exchange carriers (LECs) use to process AMA records to calculate and post tariffed charges for other carriers such a cellular companies, IXCs and CLECs.

The billing system 22 may spin-off the AMA data for completed calls, for ancillary purposes. In accord with the invention, the billing system transmits certain completed AMA message data to a server 39, for processing of certain AMA message sets for surveillance purposes. The AMA system typically records call details only for billable calls, e.g. for toll calls but not for flat-rate local calls. However, for purposes of the inventive surveillance, translations are established in the switches to make AMA records for specific subjects, preferably for those calls involving the subjects that would not normally generate common channel signaling messages. These translations insure that every call involving a subject station or line will generate either common channel signaling messages or AMA messages.

The translations in a switch take the form of control software for AMA reporting together with a CLASS definition for surveillance operations. The CLASS definition is set in the subject subscriber's profile. The CLASS definition causes the switch to generate AMA messages recording events relating to call attempts involving the subject, so as to make records of both completed and uncompleted calls. The appropriate software resides in all offices having AMA capability, and an appropriate CLASS definition is established in the subject's profile in an office to activate this AMA messaging operation.

As will be understood by those skilled in the art, AMA equipment records call details at each stage of a connection. The calling and called party numbers are registered initially. An answer entry registers the time of connection, and a terminating entry registers the time of disconnect. A common identifier in each entry serves to link the entries relating to a particular call, to distinguish them from those of other calls. The processing of the AMA data in the RAO 20 and billing system 22 assembles the entries for completed calls into complete message sets directly, which serves as the CDRs for the surveillance operations. Any incomplete messages are analyzed for administrative purposes and fraud detection. For surveillance purposes, the billing system 22 adds an identifier of the particular surveillance operation and delivers the processed AMA call data to the WAN 37. The WAN 37 in turn delivers the data to a central server 39.

The surveillance CLASS code causes a switch that detects the code in a profile to generate AMA messages regarding events in processing of the call, if the call does not involve a monitored form of interoffice signaling. In operation, the switch retrieves a subscriber profile on every call to or from the subject station. The surveillance CLASS code therefore causes the switch to determine if there is a need for AMA recording on each call to or from the subject station, and if so, to generate the AMA event messages. The switch generates the messages on all calls to or from the subject station that do not involve the monitored form of interoffice signaling.

There are several common situations that the AMA-based data surveillance covers. First the AMA surveillance applies to all intra-office calls involving the subject line or station. Intra-office calls include calls between parties having lines connected to the office as well as calls where at least one party receives service from the same office through a DLC. The central office processes the calls as an end office, both for lines connected directly to the office and for subscribers served through a DLC system coupled to the end office. This processing includes the AMA reporting for surveillance, on any intra-office calls associated with a surveillance subject as indicated by a CLASS code in the subject's profile.

Consider an example. Assume that a party at station $1_B$ is the subject of surveillance. Calls from station $1_C$ to station $1_B$ and calls from station $1_B$ to station $1_C$ are intra-office calls. The serving switch 13 uses the profile for the line to station $1_B$ either as the called party profile or as the calling party profile. In either case, that office 13 recognizes the surveillance CLASS code in the profile and determines that the call does not involve interoffice signaling because it is an intra-office call. The end office 13 therefore responds to the CLASS code in the profile by generating AMA messages recording events in the processing of the calls.

Calls between the station $1_D$ and the subject station $1_B$ also are intra-office calls processed by the end office 13, and receive essentially the same AMA treatment for surveillance purposes. Specifically, the end office switch 13 serves as the end office for the station $1_D$, even though that station connects through the RT 18 and the COT 16 of the DLC system. If the station $1_D$ is the subject of the surveillance, the end office switch 13 stores the requisite CLASS code in the subscriber profile for the service of that station and generates the requisite AMA messages.

Another common situation where AMA recording for surveillance should apply relates to calls through offices or other carriers' networks that do not utilize interoffice signaling subject to monitoring for surveillance purposes. In some cases, interoffice signaling links used for such calls may not pass the appropriate monitors. More often, however, the end office or carrier serving the other party to a call involving the subject utilizes in-band interoffice signaling, not the CCS signaling monitored for the CALEA surveillance.

Again, it may be helpful to consider an example. In the network 3 of FIG. 2, the end office 14 is an older office that lacks common channel signaling (CCS) capability. The end office 14 may be that of an independent or CLEC carrier, or simply an older smaller office still maintained by the carrier operating the more advanced elements of the network 3. Calls between the subject station $1_B$ and a station $1_E$ served through the old end office 14 would not involve CCS signaling. However, the end office switch 13 would use the profile of the line to the subject station $1_B$, either as, the called party profile or as the calling party profile on any such call. Again, that office would recognize the surveillance CLASS code in the profile and determine that each call between $1_B$ and $1_E$ does not involve interoffice signaling. The end office 13 therefore responds to the CLASS code in the subject's profile by generating AMA messages to record events in processing of all calls from station $1_E$ to station $1_B$ and from station 13 to station $1_E$.

Even the older offices such as 14 have the AMA reporting capability. If the non-CCS office 14 serves the subject, say at station $1_E$, then the CLASS and AMA software in that office would cause the office 14 to generate AMA messages -for all calls and attempts involving the subject station.

The preferred embodiment utilizes the AMA recording for surveillance in combination with monitoring of out-of-band signaling messages. Consider now the out-of-band signaling aspects of the network 3.

The switched portion of the telephone network consists of a series of central office (CO) switches. With reference to a signaling system seven (SS7) implementation of a common channel signaling network for the PSTN, the COs are conventionally referred to as signaling points (SPs). Alternatively, those offices having trigger recognition and signaling capability may be referred to as service switching points (SSPs), of an intelligent version of the PSTN. Certain of the SPs or SSPs comprise end offices (EOs), such as the offices 11, 13 and 15. Other SPs serve as tandem offices, illustrated for example at 17 and 19 in this drawing. The end office 14 has no SS7 signaling capability and is neither a SP nor a SSP.

Customers' telephone equipment connects through telephone lines or other links to the end offices. Examples of such equipment include normal telephone stations shown at 1 as well as various data devices such as PCs and ISP hardware (not shown).

Each office serving as a signaling point (SP) has a point code comprising a 9-digit code assigned to every node in the SS7 signaling network. Messages communicated via the signaling network utilize the codes to identify source and destination SPs, and the surveillance system can translate these point codes to identify particular offices, if desired. Also, each operating company or carrier has its own network or "member" ID, which is used as the first three digits of the point codes of the SPs of that carrier's network. One technique for identifying all carriers involved in processing of a particular call relies on translation of the member IDs into names of the carriers. For example, if the carrier conducting the surveillance is a local exchange carrier (LEC), the signaling data could at least identify that carrier and the next carrier handling the call, such as an interexhcnage carrier IXC.

Digital trunk circuits, shown as solid lines, interconnect the switching offices. Typically, within a carrier's network end offices, such as end offices 11 and 13, are directly interconnected by trunk circuits. For overflow traffic and/or for connections to other carrier networks, the offices 11 and 13 also connect via trunk circuits to a tandem office 17. In another region or in another carrier's network, the end office 15 connects through a trunk circuit to a tandem 19. The networks in the different territories interconnect through trunk circuits shown for example between the tandems 17 and 19.

The end office 14, without common channel signaling capability, also connects to one or more of the other offices through trunk circuits. In FIG. 1, for example, the office 14 connects to the SP end office 13. Typically, the office 14 would connect to a number of other end offices as well as to the tandem. The trunks connected to the end office 14 are similar to those interconnecting the other offices, except that the trunks connected to the office 14 carry the requisite signaling information in-band, that is to say within the channels used to carry the actual call traffic.

The preferred embodiment of the present invention relies on monitoring of the SS7 interoffice signaling messages. To understand the monitoring functions it may be helpful to review the interoffice signaling functions of the network in somewhat more detail.

The SS7 type interoffice signaling network comprises a series of Signal Transfer Points (STPs) shown here at 21, 23, 25 and 27 and interconnecting data links indicated by dotted lines. Each STP in a network 3 connects to the SP or SSP capable offices in that network via A links. Thus, the end offices 11, 13 and the tandem 17 in one region connect to the STPs 21, 23 through A links. Similarly, the end office 15 and the tandem 19 in another region connect to the STPs 25, 27 via A links.

Within one area, the STPs 21 and 23 constitute a mated pair of STPs connected to each other via C links. Within another service area, the STPs 25 and 27 also constitute a mated pair connected by C links 58. Each of these mated pairs serves its respective transport area and/or carrier network. Persons skilled in the art will recognize that there may be multiple mated pairs per region or carrier, one pair for each designated transport area and the STP pairs may be arranged in a hierarchy. Also, different carriers may provide the switches and STPs within a particular area. For example, some CLECs contract with an IXC, such as AT&T, to provide the STP service for the CLECs' switch networks. The STPs provided for a CLEC by the IXC continue to perform the packet switching functions for interoffice signaling for the IXC's own network.

The STP 21 connects to the STP 25 via a B link, and the STP 21 connects to the STP 27 via a D link. Similarly, the STP 23 connects to the STP 27 through a B link, and the STP 23 connects and to the STP 25 through another D link. As will be understood, the A, B, C and D links are physically identical links. The letter designations for these various links relate to cost in terms of ease of access.

The STPs in any mated pair have the same translations. Thus, the translations in STP 21 are the same as the translations in STP 23, and the translations in STP 25 are the same as the translations in STP 27. The translations control the message routing through the STP.

The STPs also may connect through A links to transactional database systems, such as Service Control Points, Integrated Service Control Points or the like. FIG. 2 shows a Service Control Point (SCP) 29, as a representative example. Such database systems provide call control information for a wide range of recently developed enhanced features. For example, certain types of call redirection services rely on query and response procedures in which the SCP 29 provides control information to the SSP offices. Although not shown, other database systems coupled to the SS7 network, such as the Line Identification Database (LIDB) provide information for ancillary purposes, for example, for credit card validation, for enhanced versions of Caller ID, etc. The SS7 monitoring for surveillance purposes captures messages going to and from the tandems and end offices and can capture messages communicated to and from the database systems, such as the SCP 29.

The preferred embodiment of the present invention compiles signaling data relating to calls of subjects under surveillance based in part on capture and processing of the common channel signaling (CCS) messages exchanged between offices, during otherwise normal call processing, typically implemented in the signaling system seven (SS7) protocol. For SS7, typical application layer protocols include Transaction Capability Application Part (TCAP); Operations, Maintenance, Application Part (OMAP); and ISDN User Part (ISDN-UP or ISUP). TCAP provides the signaling protocols for exchange of non-circuit related, transaction-based information, typically for accessing databases such as service control points. OMAP specifies protocols for certain specialized messages relating to maintenance and operations. The surveillance system captures and analyzes some TCAP messages and could also process OMAP messages. For surveillance purposes, however, the most relevant messages are those of the ISDN-UP, sometimes referred to as "ISUP".

ISDN-UP specifies the procedures and message protocols for setting up and tearing down trunk connections for calls utilizing common channel signaling (CCS). ISDN-UP messages, for example, include set-up related messages such as an Initial Address Message (IAM), an Address Complete Message (ACM), and an Answer Message (ANM). ISDN messages also include tear-down related message, such as a SUSpend (SUS) message, a Release Message (REL), and a Release Complete-Message (RLC).

An originating office sends an IAM message to an office terminating the next leg of a call, i.e. in the forward direction, to initiate seizure of an outgoing trunk connection. The IAM message provides information, such as calling and called party number information, for routing and handling of the call.

The terminating office sends the ACM message in the backward direction to the originating office. The ACM message indicates that the terminating office has all of the address signals necessary for routing the call to the called party. If the called destination is available (not busy), the ACM message also indicates this status.

The terminating office sends the ANM message in the backward direction to the originating office. The ANM message indicates answering of the call. As such, the ANM message signifies the start of the completed connection, for example, for purposes of timing the duration of the call.

The REL message may be sent in either direction, i.e. by either the originating office or the terminating office. At least one office that is processing an interoffice call will always send an REL message, to indicate that a call can not be completed or as part of the signaling to tear down a circuit after one or both parties disconnect. The REL message identifies a circuit and indicates that the circuit is being released. The REL message includes a cause code specifying the reason for the release.

An office receiving an REL message executes its procedures for returning the identified circuit to idle and then informs the other office by sending back an RCL message. The RCL message effectively informs the other office that the circuit has returned to its idle state and as such indicates the end of the circuit connection.

If a called party that does not have ISDN service disconnects or hangs-up to end a call, the serving end office detects this condition and sends an SUS message. The SUS message indicates the disconnect and causes the originating office to initiate its procedures for tear-down, for example by sending an REL message to the terminating office. If the calling party disconnects first, or if the called party disconnects first but has ISDN service, the office detecting the disconnect sends the REL message.

The lower three layers of the SS7 protocol, the network layer, the signaling link layer and the data link layer, form the Message Transfer Part (MTP) of SS7, for the TCAP, OMAP and ISDN-UP protocols. The MTP is common to messages for all applications and provides reliable transfer of signaling messages between network nodes. The MTP relays messages between applications running at different nodes of the network, effectively like a datagram type service.

The SS7 messages comprise digital serial messages sent to a STP for routing. FIG. 3 provides a graphic illustration of an SS7 message packet. The message is arranged in 8 bit bytes or octets. The message includes octets representing a start flag, a routing label for MTP processing and certain specialized indicators. Examples of such indicators include a Signaling Link selection Code (SLC), a Carrier Identification Code (CIC) and a message type indicator. Octets 15-N carry the information of the message in the form of fixed, mandatory and optional parameters. The lengths of the mandatory parameters field and the optional parameters field are variable. The message ends with an octet for a cyclic redundancy code (CRC) for error correction, which typically is followed by the flag at the beginning of the next message.

For purposes of the MTP processing, each SS7 message includes the routing label in octets 2–11. The addressing information used for the MTP appears in the routing label. FIG. 4 is a graphic illustration of the routing label of the SS7 message packet. The routing label includes a series of indicators, a service information octet and fields for both destination related addressing and point of origin addressing.

Octet 5 is the service information octet. This byte indicates the type of service information, for example by inclusion of a code for a Message Signaling Unit (MSU).

The origination or 'calling party' address for the SS7 packet message itself includes octets 9, 10 and 11. These 'calling party' address octets carry origination point code (OPC) information, for example member, cluster and network ID information, for the node on the SS7 network sending the message.

The destination or 'called party' address for the SS7 packet message itself includes octets 6, 7 and 8. These three octets carry destination point code (DPC) information for example member, cluster and network ID information, for the node on the SS7 network targeted to receive the message.

In operation, the translation tables stored in a STP cause the STP to actually route based on the DPC without translating any of the DPC octets into new values. The called party address octets (6–8), however, may carry other types of called party addressing information, such as a global title translation (GTT) and subsystem number (SSN) information, and receive different treatment by the STP. The STP examines a message signaling MSU type indicator in each message to determine if there is a need for translation, e.g. from GTT to DPC, before routing the message.

A detailed explanation of the SS7 protocol may be found in Bell Communications Research, "Specification of Signaling System Number 7," Generic Requirements, GR-246-CORE, Issue 1 December 1994, the disclosure of which is incorporated herein in its entirety by reference.

The SS7 network constitutes a highly redundant data network, generally using 56 K switched data circuits for the various links to and between the STPs. Because of the redundancy, different signaling messages for a given call may actually transit different routes through the SS7 network.

An SS7 monitoring system may be implemented in any carrier's network or within any transport area of the PSTN. In the example illustrated in FIG. 2, a LEC might already implement the monitoring system around a selected mated pair of STPs 21, 23, for example for fraud detection or traffic tracking purposes. According to the invention the LEC deploys a traffic monitoring system comprising monitors 31, card cages 33 and one or more site processors or servers 35. One example of a commercial implementation of such an SS7 monitoring system is currently available from Hewlett Packard, under the product name "AcceSS7".

FIG. 2 shows the sets of monitors or interfaces $31_1$, $31_2$ to the SS7 links to the STPs 21, 23 in diagrammatic form, as solid bold lines across respective links. A card cage $33_1$ connects the monitors $31_1$ to a site processor 35. Similarly, a card cage $33_2$ connects the monitors $31_2$ to the same or another site processor 35. The monitors 31 may be conductively or non-conductively coupled to the links to serve as passive interfaces. Alternatively, the monitors 31 may comprise active traps. The monitors effectively trap copies of SS7 messages passing over the monitored links. The card cages 33 connect the monitors 31 to the site processor 35 for accumulation, storage and processing of data from the raw SS7 messages.

It is intended that multiple monitoring systems of this type serving different purposes may advantageously exist in the PSTN, for example for operations monitoring and/or fraud detection or traffic tracking and analysis. The illustrated system may be used exculsively for surveillance, but preferably it also serves one or more of these other purposes. For simplicity and clarity, however, only a single system is here illustrated.

The SS7 signaling in a completed call typically includes an Initial Address Message (IAM), an Answer Complete Message (ACM), an Answer Message (ANM), a Release Message (REL) and a Release Complete Message (RLC). The signaling messages for a call that does not complete will include at least the IAM, REL and RCL messages. Monitoring the SS7 messages therefore can provide call-associated data for both completed and uncompleted calls.

Since the common channel signaling system is intentionally redundant, the messages in a related set may be routed over different A links and/or through different STPs. The monitors trap messages on all links going to and from a mated pair serving a particular area, in order to capture all messages relating to an individual call attempt. This enables the system to compile call associated data for all completed and uncompleted calls associated with the subject of the surveillance that involve interoffice signaling.

Consider first a simple example of an interoffice call. Assume that the subject of the signaling data surveillance owns the station $1_B$. On a call from station $1_A$ to the subject's station $1_B$, the IAM may go through STP 21, whereas the ACM and ANM may just happen to go through the STP 23. The REL and RCL messages also may use different links and/or different STPs. It is therefore necessary to set the system to monitor an appropriate set of links and to reassemble the signaling pertaining to a desired transaction or signaling message set such as for a single call, to provide one call detail record or CDR. This is accomplished in the site processor 35. In our example, the link set for surveillance on the subject station $1_B$ would include all of the A links between the end office 13 and the STPs 21, 23.

With the reassembled message sets the site processor 35 has the data to show the called and calling stations $1_A$, $1_B$, the start time and elapsed time of the call if completed, the originating office, the terminating office, and various other detailed data. The SS7 monitoring system may capture all messages communicated over the designated links. For surveillance purposes, however, the card cages and site processor are programmed to perform a data filtering function. Specifically, the system compiles CDRs for all calls associated with a telephone number of a subject under surveillance. Messages relating to other calls may be used for other purposes, such as fraud detection or traffic analysis, but otherwise may be discarded. The site processors 35 also add an identifier to each CDR, to identify the particular surveillance operation.

The assemblage of the raw call detail data desired for a particular purpose therefore occurs at the site processor level. One or more site processors 35 accumulate the CDRs for the surveillance application of the present invention. Periodically, each site processor 35 transmits the latest set of CDRs over a private wide area network (WAN) 37, operated by the carrier for its internal business purposes. The WAN 37 may carry a variety of network operations data. For purposes of the discussion, the WAN transports the CDRs from the site processor 35 to the server system 39 running a program for processing the call associated data as outlined above relative to steps S7, S8 in FIG. 1.

The server system 39 comprises one or more computer systems coupled for communication over the WAN 37. The computer(s) of the server system 39 run software implementing the data translation and formatting operations.

One or more computers in the server system 39 also provide communications to a data system 7 operated by the law enforcement agency (LEA). The link from the server system 39 to the LEA data system 7 carries the processed records in the protocol approved by the LEA. Preferably the server system formats the records in lawfully authorized electronic surveillance protocol (LAESP). The data link to the system 7 may be any convenient data link providing adequate speed and security. Typically, this is a dedicated data link, in order to insure security and privacy.

As shown by the above discussion, the network 3 utilizes certain accounting messages and monitoring of interoffice signaling messages to accumulate the call associated data for purposes of lawful surveillance. Program-controlled switching offices of the network,generate both the accounting messages and the interoffice siganling messages. To fully understand the implementation of the preferred embodiments, it may be helpful to briefly review the structure and relevant operations of a switching office of the network 3.

Figure 5:
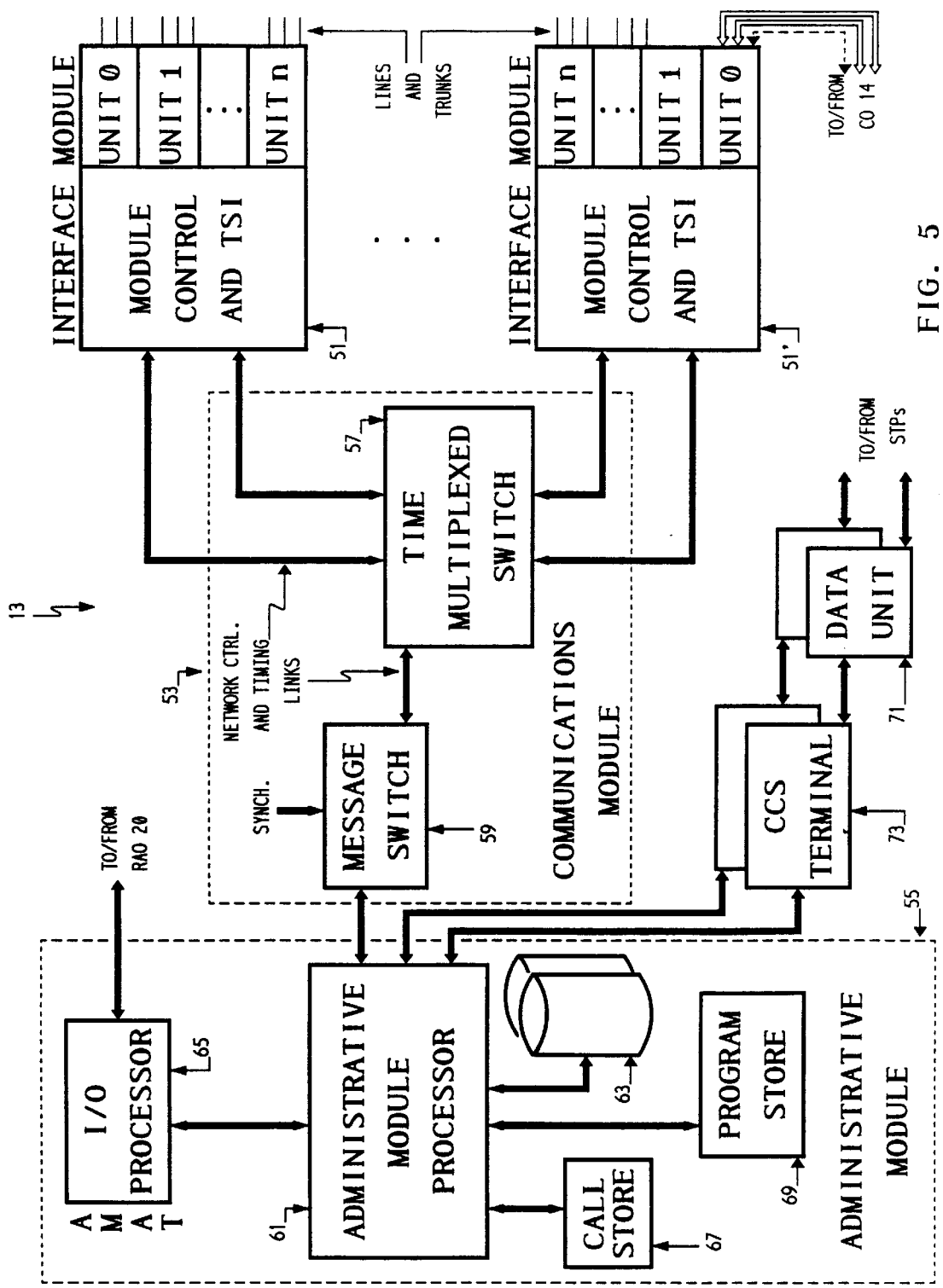
FIG. 5 is a functional block diagram of a central office switching system, including the elements for processing calls, conducting interoffice signaling and transmitting automatic accounting messages.

FIG. 5 is a simplified block diagram of an electronic program controlled switch which may be used as any one of the SP or SSP type central offices in the system of FIG. 2. For purposes of discussion, however, assume that the switch of FIG. 5 represents the end office 13.

As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Where the interfaced circuit is analog, for example a POTS subscriber loop, the interface unit will provide analog to digital conversion and digital to analog conversion. Alternatively, the lines or trunks may use digital protocols such as ISDN, fractional T1, full T1 or higher rate digital protocols. Each interface module 51 also includes a digital service unit (not shown) which is used to generate call progress tones and receive and detect dialed digits in pulse code or dual-tone multifrequency form.

In addition to the noted interface units, each interface module 51 includes a duplex microprocessor based module controller and a duplex time slot interchange, referred to as a TSI in the drawing. Digital words representative of voice information or other traffic are transferred in two directions between interface units via the time slot interchange (intramodule call connections) or transmitted in two directions through the network control and timing links to the time multiplexed switch 57 and thence to another interface module (intermodule call connection).

Interface modules 51 may serve as line net modules, for providing subscriber line interfaces, or as trunk net modules for interfacing to trunks extending to other offices. Advanced versions of the interface modules 51 may simultaneously provide line and trunk interfaces. In the illustrated example, the interface module 51' serves as a trunk net module for an interoffice trunk connection to the central office 14. This trunk connection carries a number of channels for telephone call traffic, and those channels transport the necessary interoffice signaling within the traffic channels, i.e. in-band.

The communication module 53 includes the time multiplexed switch 57 and a message switch 59. The time multiplexed switch 57 provides time division transfer of digital voice data packets between voice channels of the interface modules 51 and transfers signaling data messages between the interface modules. The switch 57 together with the TSIs of the interface modules forms the overall switch fabric for selectively connecting the interface units in call connections.

The message switch 59 interfaces the administrative module 55 to the time multiplexed switch 57, so as to provide a route through the time multiplexed switch permitting two-way transfer of control related messages between the interface modules 51 and the administrative module 53. In addition, the message switch 59 terminates special data links, for example a link for receiving a synchronization carrier used to maintain digital synchronism.

The administrative module 55 provides high level control of all call processing operations of the switch 13. The administrative module 55 includes an administrative module processor 61, which is a computer equipped with disc storage 63, for overall control of CO operations. The administrative module processor 61 communicates with the interface modules 51 through the communication module 53. The administrative module 55 includes one or more input/output (I/O) processors providing interfaces to terminal devices for technicians and data links to operations systems for traffic, maintenance data, etc. Of particular note, one of the I/O processors 65 provides the administrative module with a data communication link, for communication of AMA messages to the RAO 20. The I/O processor 65 and AMA software in the administrative module processor 61 together serve as the AMAT for transmitting the AMA records in the BAF format to the RAO 20.

A CCS terminal 73 and an associated data unit 71 provide an SS7 signaling link between the administrative module processor 61 and one of the STPs (see FIG. 2). FIG. 5, shows two sets of terminals and data units, for providing two 56 kb/s SS7 links to the STPs 21, 23 of a mated pair. The links provide redundant connections to both STPs of a mated pair, and there may be more than one link to each STP to provide sufficient capacity to carry all necessary signaling to and from the particular office. The SS7 signaling through the terminals 73, the data units 71 and the STPs 21, 23 provides two-way signaling data transport. This transport carries the ISDN-UP call set-up messages to and from other SP or SSP capable offices as well as TCAP communications between the office 13 and database systems or the like, such as the SCP 29.

As illustrated in FIG. 5, the administrative module 55 also includes a call store 67 and a program store 69. Although shown as separate elements for convenience, these are typically implemented as memory elements within the computer serving as the administrative module processor 61. The program store 69 stores program instructions which direct operations of the computer serving as the administrative module processor 61. This programming includes programming to control generation of AMA messages during call processing. In accord with the invention, this AMA-related programming includes executable code for recognizing the CLASS code for the surveillance operations and generating the appropriate AMA messages for the surveillance. The disc storage system 63 stores large volumes of data, including the subscriber profiles associated with all communication links coupled to the switching office 13.

For each call in progress, a register assigned within the call store 67 stores translation and user profile information retrieved from disc storage 63 together with routing information and any temporary information needed for processing the call. For example, for a customer initiating a call, the call store 67 would receive and store line identification and outgoing call billing information corresponding to an off-hook line initiating a call. This information would include all service CLASS definitions associated with the service for that line. For example, if the line were under surveillance, the profile loaded into the register would identify the special CLASS defined for call data reporting for surveillance purposes.

A register in the call store 67 is assigned and receives profile data from the disc memory 63 both for originating subscribers on outgoing calls and for terminating subscribers on incoming calls. Of particular note, the administrative module processor 61 will load the profile associated with a subject line into an assigned register in the call store 67, for each and every call attempt to the number of the subject line and for each and every call attempt from the subject line. The register will always include the surveillance CLASS code.

As the administrative module processor 61 controls processing of the call through the switch 13, the processor 61 examines the CLASS code. Based on the CLASS code for surveillance, the processor 61 determines whether or not the current call involves CCS signaling through a monitored link. If so, then the processor 61 makes AMA records only if necessary for billing or other purposes. The processor 61 does not initiate any AMA records for the surveillance operation. However, if the incoming or outgoing call for the subject line does not involve any monitored CCS signaling, then the administrative module processor 61 generates AMA messages as events occur during processing of the call, regardless of whether the call is billable. The administrative module processor includes a surveillance identifier, in each AMA message relating to the subject, even if the AMA message also is intended for some billing function. The processor 61 forwards each such record to the I/O processor 65 for transmission to the RAO 20.

The end office normally generates AMA records for billable inter-office calls. Some intra-office calls will produce AMA records for billing, e.g. if the office serves more than one rate center. The end office 13 also generates AMA records for billing on interoffice calls to the non-CCS office 14. Many of the AMA messages relating to billing will not include the identifier signifying surveillance of the subject, because the calls produce CCS signaling for capture by the SS7-based monitoring system. However, for calls not generating the monitored CCS signaling, the administrative module processor identifies the AMA records as relating to surveillance, e.g. by including the surveillance CLASS code. As discussed, the processor generates such AMA records even for unbillable calls and for attempts on uncompleted calls.

Returning to FIG. 2, it may be helpful to consider an example of a surveillance operation and specific call processing examples, in somewhat more detail. Assume again, that the subject under surveillance is associated with the station $1_B$. The CCS monitoring equipment is set to capture messages and compile CDRs for all calls involving the telephone number of the station $1_B$. The carrier also records the surveillance CLASS code in the profile for the station $1_B$ in the disc storage 63 of the serving end office 13, to insure generation of AMA messages for calls not requiring the CCS messages.

Now assume that a person places a call from the station $1_A$ to the targeted subject's station equipment $1_B$. The caller at station $1_A$ lifts the handset, hears dialtone and activates the keypad of the station to dial the telephone number of the station $1_B$. The SP end office 11 initiates its procedures for processing an outgoing call from a line connected to that office. For example, the administrative module processor assigns a register in the call store to this call, retrieves a subscriber profile associated with the line, loads that profile into the register and collects the dialed digits in the register. The SP end office 11 determines that the dialed call is allowable from the CLASS codes in the profile and recognizes that the desired call is an interoffice call from the dialed digits. In our example, the calling station $1_A$ is not the subject of surveillance, therefore the CLASS codes in this first profile do not relate to any surveillance function. The end office 11 generates AMA messages only if other processes require such messages, for example, to enable billing if this is a chargeable call.

The SP end office 11 generates an Initial Address Message (IAM) with a destination point code for the end office 13 and an originating point code of the end office 11. The IAM includes a variety of information needed for call set-up, including the dialed number. The end office 11 sends the IAM either to STP 21 or to STP 23. That STP examines the address information and its translations and routes the message offer the next appropriate link, in this case over the A link to the end office 13.

In response to the IAM message, SP end office 13 initiates its procedures for processing an incoming interoffice call. As part of this process, the administrative module processor in the office 13 assigns a register in the call store to this call. The processor retrieves a subscriber profile associated with the destination number from storage, loads that profile into the register and loads other fields in the register with information from the IAM message. The loaded profile for station $1_B$ also includes CLASS codes relating to the subscriber's services. In our example, the CLASS codes in the profile for station 1B include the code for surveillance. The administrative module processor in the office 13 therefore checks to see if the call involves monitored CCS signaling. In this case, it does, therefore the processor does not initiate the AMA reporting for the surveillance.

If the CLASS codes allow completion of the call, and there is no triggering of communication with a SCP or the like, the SP end office 13 determines whether or not the line to the station $1_B$ is available. If available (not busy), the end office 13 generates an Address Complete Message (ACM) to indicate that it received the request for a call and that the called line is available. The end office 13 sends the ACM message back by simply reversing the origination and destination point codes and sending the message over an A link to one of the STPs 21, 23. The ACM may or may not go over the A link that carried the IAM to the end office 13, and it may go to the other STP of the pair. Again, the STP receiving the message examines the addresses and uses its translations to forward the message over another link to the appropriate destination, in this case the end office 11.

The end office 11 sends ringback tone over the line to the telephone $1_A$, so that the caller hears a ring-like notice tone and will await an answer. At about this time, the end office 13 applies a ringing signal to the line to the called station $1_B$. The station $1_B$ audibly rings, to alert anyone nearby of the presence of the incoming call.

A person may lift the handset of the station $1_B$, or an answering machine may respond. Either event closes the loop circuit through the line to establish an "off-hook" condition on the called line. The end office 13 detects this new condition as an answer and interrupts the ringing signal on that line. The end office 13 also sends an Answer Message (ANS) back through the SS7 network to the end office 11, indicating that the called station $1_B$ has answered.

At that time the necessary trunk circuits between the end offices are connected together and assigned to the call. The trunk connection may run through the tandem 17, which would require separate call set-up and signaling for each leg of the call to and from the tandem. In this simplified example, assume that the trunk connection extends directly between the end offices. The end office 11 connects the line for the station $1_A$ to the trunk circuit, and the end office 13 connects the line for the station $1_B$ to the trunk circuit. At this point a complete voice-grade telephone connection exists between the two stations, and the caller and the person answering call may conduct a normal two-way voice conversation.

Later, when one of the parties terminates the session, the offices 11, 13 exchange messages via either of the STPs 21, 23 in a procedure for tearing down the call connection over the trunk circuit. The precise procedure for release differs slightly depending on the type of service, POTS or ISDN, provided to the called party, in this case the station $1_B$. In any case, however, the signaling includes an REL message initiating circuit release and an RCL message to indicate completion of the release process.

To capture all of the interoffice signaling messages relating to the exemplary call, the card cages 33 are set so that the monitors 31 capture A-link signaling messages to and from the office 13 serving the subject's station $1_B$. The card cages 33 may be set so that the monitors 31 capture A-link signaling messages going to and from the tandem 17 and/or the SCP 19, if desired. For the exemplary call, the site processor 35 compiles a CDR from the complete set of SS7 messages relating to the call between the stations $1_A$ and $1_B$. The site processor 35 transmits the CDR through the WAN 37 to the server system 39. The server translates the data, if desired, and formats the data as required by the LEA to form a surveillance record of the call. The server 39 then transmits the surveillance record to the LEA data processing system 7.

A similar signaling procedure occurs on interoffice calls from the subject station $1_B$, except that the office 13 is the originating office. The exact same set-up and procedure for monitoring and processing will deliver a CDR for such a call to the LEA system 7.

The same monitor set-up also enables capture of messages relating to inter-office calls that the network 3 fails to complete to or from the subject station. On any interoffice call that does not complete, one of the offices will send an REL message and receive an RCL message. In all cases, whether completed or not, the REL message includes a cause code identifying the reason for the release.

Consider again a call from a person using the telephone station $1_A$ to the station $1_B$. Again the caller lifts the handset, hears dialtone and dials the telephone number of the station $1_B$. The SP end office 11 generates an IAM message and sends that message through either the STP 21 or the STP 23 to the end office 13. In this example, however, assume that the end office 13 determines that the call can not be completed.

Typically, in response to the IAM message, the end office 13 determines whether or not the line associated with the dialed number is available. If the line is engaged at this time (busy), the end office 13 generates an REL message containing a cause code indicating a "user busy" condition. The end office 13 sends this REL message back by simply reversing the origination and destination point codes from the IAM message and sending the message over an A link to one of the STPs 21, 23. Again, the STP receiving the message examines the addresses and uses its translations, and now it forwards the REL message over another link to the appropriate destination, in this case the end office 11. The end office 11 provides a slow busy tone over the line to the calling telephone $1_A$, indicating that the dialed destination is busy. When the caller hangs-up the station $1_A$, following the busy signal, the end office 11 sends back an RCL message indicating that the circuit has returned to the idle state. Similar call processing and interoffice signaling occurs on calls from the subject station $1_B$ that can not be completed for user busy or other reasons.

The monitoring of the signaling links captures signaling messages for calls involving the subject station $1_B$, even if the other party to the call receives service in a distant region or through another carrier's network. All inter-LATA and inter-carrier calls are by definition interoffice calls. As a result, all such calls involve interoffice signaling. Most carriers today utilize common channel signaling for interconnection between carriers if at all possible, and the invention accumulates call data for surveillance purposes by monitoring the common channel signaling messages.

For example, consider communications between the station $1_F$ receiving service through another carrier's end office switch 15 and the subject station $1_B$. The calls involve routing through the tandems 17. All such calls involve common channel signaling on a number of the legs of the call, including the leg between the two tandems and the leg between the tandem 17 and the end office 13 serving the subject. Both of these legs involve common channel signaling through STPs and signaling links operated by the carrier conducting the surveillance for the LEA. The signaling links carrying the messages relating to these legs of the calls are subject to monitoring by the monitors 31, the card cages 33 and the site processor 35, particularly the signaling links on the leg to the end office 13 serving the subject. Consequently, the monitoring system can capture messages and compile CDRs for all attempted calls to or from the station $1_F$ with the subject station $1_B$.

The monitoring of the SS7 interoffice signaling messages on the A links connected to the end office 13 can capture all of the signaling involved in the above described examples of completed and uncompleted calls to or from the subject station $1_B$. In this manner, the system of FIG. 2 can supply detailed records of all call attempts to or from the subject station, if those call attempts involved common channel interoffice signaling. The monitoring of the signaling messages can compile CDRs for calls to or from stations in the same transport area, such as the exemplary calls between the station $1_B$ and the station $1_A$. The monitoring of the signaling messages also can compile CDRs for calls to or from stations in other transport areas or served through other carriers' networks, such calls between the station $1_B$ and the station $1_F$.

If any of the completed or uncompleted calls discussed above involved an intelligent network type service, an office would detect a trigger and communicate with the SCP 29 to obtain the necessary control information. If the only triggers are set in the office 13, the monitoring of the links to that office would be sufficient. However, some intelligent network services involve triggering and signaling from other offices. To capture all messages to and from the SCP 29 relating to the subject, the card cages 33 and monitors 31 could capture messages from the A links to the SCP 29. For example, the SCP might provide instructions to redirect a call for the station $1_B$ to the station $1_C$. The monitoring system could detect the TCAP messages communicated to and from the office 13 and/or the SCP 29 and add any useful information from those messages to the CDRs for calls associated with the subject station.

Also, the monitoring of signaling messages to the database systems can capture data for calls related to the subject's telephone number but never routed to or from the subject station. For example, if the SCP 29 serves as a LIDB database for calling card billing services, the monitoring of the links to the SCP 29 would capture messages going to and from the LIDB for any calls involving the subject station $1_B$. Such monitoring would capture messages relating to a call from station $1_F$ to a station $1_A$, where the caller invoked a credit card billing service using the telephone number of station $1_B$ as the calling card or "bill-to" number.

In the above examples, the call processing involved interoffice signaling through the common channel links. The surveillance therefore relied on monitoring of the common channel signaling messages. Since the CCS monitoring provided adequate data for the surveillance, there was no need to activate the AMA recording. It will be noted, however, that the offices of the network 3 may have generated AMA records, albeit for billing or other purposes.

Other calls, however, do not involve common channel signaling that can be detected by the monitoring system. Certain calls are strictly intra-office calls and do not involve interoffice siganling. Other calls may go to or come from a carrier's network or an individual office using some other form of interoffice signaling, typically some form of in-band signaling. Although not shown, some common channel signaling utilizes dedicated links between offices instead of routing through the STPs and past the monitors 31. In any of these cases, the monitoring on the links around the STPs would not capture any messages useful in compiling a CDR record of the calls.

To capture call associated data for those calls not involving the monitored common channel signaling, the inventive surveillance system relies on the AMA records. Several examples were outlined earlier, but it may be helpful to reconsider the call processing of one of those examples in somewhat more detail.

Assume again that a party at station $1_B$ is the subject of surveillance and now a party at station $1_C$ dials the telephone number of the station $1_B$. The end office switch 13 initiates its procedures for processing an intra-office call. As part of this process, the administrative module processor in the office 13 assigns a register in the call store to this call. The processor retrieves subscriber profiles associated with the calling station $1_C$ and the destination number from storage. In this example, the profile for the dialed destination number is that associated with the subject station $1_B$. The processor loads both profiles into the register. One of the profiles, in this case the called party's profile, includes the CLASS code for surveillance. This code activates AMA messaging functions, since this call does not involve the monitored CCS signaling.

The administrative module processor in the end office 13 therefore creates an initial AMA record for the call, containing the calling and called party numbers. The administrative module processor places the AMA message in temporary storage, in chronological order in a queue with AMA messages relating to events in other calls. Periodically, the administrative module processor initiates transmission of all currently stored AMA messages in the queue, through the I/O processor and the data link to the RAO 20.

The end office 13 determines whether or not the line to the called station $1_B$ is available. If available (not busy), the end office 13 sends ringback tone over the line to the calling telephone $1_C$, so that the caller hears a ring-like notice tone and will await an answer. The end office 13 also applies a ringing signal to the line to the called station $1_B$. The station $1_B$ audibly rings, to alert anyone nearby of the presence of the incoming call.

If the call is answered at station $1_B$, the end office 13 detects the transition to the Off-hook State as a ring-trip. The end office 13 interrupts the ringing signal on the line to station $1_B$ and interrupts the ringback tone on the line to station $1_C$. The end office sets up an intra-office connection through its internal switch fabric between the lines, to enable audio communication between the stations $1_B$ and $1_C$. At this point in the call processing, the administrative module processor generates an AMA answer entry, which registers the time of the connection. The administrative module processor stores this AMA record in the chronological queue, for later transmission with other messages to the RAO 20.

Later, when one of the parties terminates the session, the office 13 detects the disconnect and tears down the intra-switch connection between the lines to the stations $1_B$ and $1_C$. At this point in the call processing, the administrative module processor generates an AMA terminating entry, which registers the time of disconnect. Again the processor stores the message in the queue for transmission to the RAO.

In this example, the switch 13 generated an initial AMA message, an answer message and a disconnect message. Each of these messages includes a common identifier that serves to link the entries relating to the particular call. In the RAO, an MPS identifies all of the AMA messages relating to the current call and compiles those messages into a completed message set. The MPS supplies the completed AMA message set to a billing system 22, in the normal manner.

Normally, the completed AMA message set provides all of the information needed for billing a call. The billing system, however, recognizes codes in the AMA message set identifying the surveillance CLASS. In response, the billing system 22 adds an identifier of the particular surveillance operation to the CDR and transmits the completed message set through the WAN 37 to the server 39, for use as a CDR reporting the relevant data for this intra-office call. The server 39 processes data in the CDR, formats the data to form an appropriate surveillance record, and delivers the surveillance record to the data system 7 of the LEA.

The surveillance using AMA messages operates in essentially the same manner for intra-office calls initiated from the subject station $1_B$. As noted earlier, the intra-office calls include calls to and from stations such as $1_D$ served through a DLC system, whether the station $1_D$ or the other station is the subject of the surveillance. The AMA-based surveillance also operates in a similar manner on interoffice calls not involving the monitored CCS signaling, e.g. or calls between subject station $1_B$ and the station $1_E$ served through the older, non-CCS office 14.

In accord with the invention, the surveillance CLASS code causes the serving end office to generate AMA records for all call events in any call that causes the switch to access the subject's subscriber profile, particularly for calls not subject to CCS monitoring. For example, the inventive system generates AMA messages for uncompleted call attempts intended for or initiated from the subject station. In the preferred embodiment, this reporting applies to all uncompleted calls not subject to the monitored CCS signaling. Consider a user-busy intra-office call as an example.

In this example, a person using the subject station $1_B$ dials the destination telephone number for the station $1_C$. The end office switch 13 again initiates its procedures for processing an intra-office call. As in the earlier example, the administrative module processor in the office 13 assigns a register in the call store to this call and loads the calling party and called part profiles into the register. In this example, the subscriber profile for the calling party is that associated with the subject station $1_B$, which includes the CLASS code for surveillance. Again, this code activates AMA messaging functions, since this intra-office call does not involve the monitored CCS signaling.

The administrative module processor in the end office 13 therefore creates an initial AMA record for the call, containing the calling and called party numbers. The administrative module processor stores the initial AMA message in the queue in chronological order with AMA messages relating to events in other calls, for later uploading to the RAO 20. The end office 13 determines whether or not the line to the called station $1_C$ is available. If the line to the called station is not available (user busy), the end office 13 sends a slow busy tone signal over the line to the calling station $1_B$, indicating the busy status of the called party's line. Hearing this tone, the caller normally hangs up.

In accord with the invention, the CLASS code for surveillance in either of the profiles used by the switch 13 causes the administrative module processor to generate AMA messages, even if the switch can not complete the call. In our example, the CLASS code for surveillance is in the profile for the station $1_B$ used for the calling party. The administrative module processor in the end office 13 therefore creates an AMA disconnect message indicating the time that the caller disconnected and the reason for the release, in this case that the called user was busy. Again, the administrative module processor stores the message in the queue for transmission to the RAO 20. The AMA reporting similarly generates messages relating to calls to the subject station that the network fails to complete that do not involve the monitored interoffice signaling.

The inventive use of AMA messages for surveillance purposes also captures signaling data in a number of other situations of interest, such as control of switch-based special service features. For example, if the subject subscribes to a switch-based call forwarding service, the AMA reporting generates messages when the switch forwards calls, when the subject dials an activation code and new forward-to number, and when the subject dials the deactivation code. The CCS monitoring captures signaling messages going to and from the SCP with regard to redirection from the SCP. Thus, the combination of CCS monitoring and AMA surveillance provides call associated data for most if not all of the common forms of forwarding and redirection services. These surveillance techniques also capture data regarding most other switch-based and intelligent network type special service features available through public switched telephone networks. If the subsequent processing provides translation of the data in the CDRs into textual descriptors, the translation would provide the name of the relevant network services used or activated on the various recorded calls.

The surveillance techniques, for accumulating call associated data do not entail modification of the processing of the subjects' calls that is in any way detectable by the subjects or parties communicating with the subjects. There is no need to route the calls in any different manner or to reroute the calls to pass through any special surveillance equipment. Consequently, the network completes calls associated with each subject in essentially the same manner as for parties not under surveillance.

Those skilled in the art will recognize that the invention admits of a wide range of modifications, all of which fall within the spirit and scope of the inventive concepts. For example, the preferred embodiments discussed above relied on a combination of CCS monitoring and AMA messages, to provide the desired level of surveillance. In networks where the carriers have not deployed CCS monitoring equipment, it would be possible to conduct the entire surveillance operation using the AMA reporting. In such a case, the CLASS code set-up in the subject's profile would cause the serving office to generate AMA messages for events during all calls from the subject line or station and on all calls using the subject's telephone numbers as the dialed destination number, whether completed or not.

As described above, the SS7 monitoring traps messages from identified links going to and from the STPs and supplies the messages to site processors to compile the CDRs. Other forms of monitoring of the common channel signaling fall within the scope of the invention. For example, the function of the site processors might be rolled up into processor functions on the card cages. Also, a number of STP vendors have products that can supply message copies to monitoring ports, such that the STP itself performs the trapping function.

Also, in-the preferred embodiment, a separate server system 39 performed the translation operations and formatted the records as needed for transmission to the data system of the LEA. Persons skilled in the art will recognize that these functions could be moved to other processing systems in the network. For example, the site processors and/or the billing system could perform the translations and formatting.

Also, the above discussion has concentrated mainly on surveillance conducted in a landline telephone network. Those skilled in the art will recognize that the inventive surveillance technique may apply as well to wireless telephone networks and to other types of telecommunication networks.

The above discussion of the invention has concentrated on accumulation of call associated data. Many lawful surveillance operations will continue to require only the delivery of such data to the law enforcement agency. Other surveillance operations will entail delivery of communication content, as well as the call data. The present invention can provide the call data concurrently with other processing to deliver the content. Even in situations where content delivery requires specialized routing through an office having the requisite CALEA compliant surveillance equipment, the CCS monitoring and AMA messaging of the present invention provides a cost effective technique for accumulating and delivering the call associated data.

Also, on some calls, it may actually be possible to forward the surveillance CLASS code to another office. For example, if the office 13 serving the subject forwarded a call for the subject to the office 14, the office 13 could supply the CLASS code with the in-band signaling to the office 14. The CLASS code would cause the office 14 to also make an AMA record, for example to capture data regarding an intra-office reforwarding by the office 14.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of conducting lawful call associated data surveillance in a switched telecommunication network, comprising the steps of:

during processing of a call in some way associated with a subject of the surveillance, detecting a code in a service profile for the subject stored in a switching office of the network involved in processing of the call;

in response to detecting the code, generating accounting messages in the switching office, the accounting messages containing data regarding events occurring in processing of the call by the telecommunication network;

processing the accounting messages to form a detailed record of the call, the detailed record comprising significant data associated with the call; and delivering the detailed record of the call to a data system of a law enforcement agency, wherein at least one of the events in processing of the call relates to a failure of the telecommunication network to complete the call.

2. A method of conducting lawful call associated data surveillance in a switched telecommunication network, comprising the steps of:

during processing of a call in some way associated with a subject of the surveillance, detecting a code in a service profile for the subject stored in a switching office of the network involved in processing of the call;

in response to detecting the code, generating accounting messages in the switching office, the accounting messages containing data regarding events occurring in processing of the call by the telecommunication network;

processing the accounting messages to form a detailed record of the call, the detailed record comprising significant data associated with the call; and delivering the detailed record of the call to a data system of a law enforcement agency, wherein at least one of the events in processing of the call relates to activation of a special service feature provided by the switching office.

3. A method of conducting lawful call associated data surveillance in a switched telecommunication network, comprising the steps of:

during processing of a call in some way associated with a subject of the surveillance, detecting a code in a service profile for the subject stored in a switching office of the network involved in processing of the call;

in response to detecting the code, generating accounting messages in the switching office, the accounting messages containing data regarding events occurring in processing of the call by the telecommunication network;

processing the accounting messages to form a detailed record of the call, the detailed record comprising significant data associated with the call, wherein the step of processing the accounting messages comprises translating at least one item of information in one of the accounting messages into corresponding descriptive textual information; and delivering the detailed record of the call to a data system of a law enforcement agency.

4. A method as in claim 3, wherein the descriptive textual information comprises a name of a party to the call.

5. A method as in claim 3, wherein the descriptive textual information comprises an address of a party to the call.

6. A method as in claim 3, wherein the descriptive textual information identifies a special service feature provided for the subject by the switching office.

7. A method as in claim 3, wherein the descriptive textual information identifies a carrier operating a network involved in processing of the call.

8. A method of conducting lawfully authorized call associated data surveillance on calls processed through a telecommunication network, the telecommunication network comprising a plurality of interconnected switching offices and a common channel signaling network for interoffice signaling, the method comprising the steps of:

monitoring messages transported on links of the common channel signaling network;

from the monitoring, capturing common channel signaling messages relating to network processing of a first group of calls in some way associated with a subject of the surveillance, the first group of calls consisting essentially of calls that involve the monitored common channel signaling;

processing the captured messages to form a call detail record of each of the first group of calls associated with the subject;

processing a second group of calls in some way associated with the subject through one of the switching offices, the second group of calls consisting essentially of calls not involving the monitored interoffice signaling;

generating accounting messages in the one switching office containing data regarding events in processing of each call in the second group of calls;

processing the accounting messages to form a detailed record of each call in the second group of calls; and delivering the call detailed records for the first group of calls and the detailed records of the second group of calls to a data system of a law enforcement agency.

9. A method as in claim 8, wherein:

the monitored common channel signaling messages comprise signaling system seven (SS7) messages; and the accounting messages comprise automatic message accounting (AMA) messages.

10. A method as in claim 9, wherein:

the network comprises a switched telephone network; and the switching offices comprise telephone switches.

11. A method as in claim 8, wherein:

the first group of calls comprises interoffice telephone calls associated with the subject; and the second group of calls comprises intra-office telephone calls associated with the subject.

12. A method as in claim 11, wherein each group of calls includes completed and uncompleted calls associated with the subject.

13. A method as in claim 8, wherein at least one of the groups of calls includes one or more calls relating to control of a special service feature of the network by the subject.

14. A method as in claim 8, wherein one of the calls in the second group of calls comprises an interoffice call that does not involve the monitored interoffice signaling.

15. A method as in claim 14, wherein the one call in the second group of calls comprises an interoffice call processed through a switching office using in-band interoffice signaling.

16. A surveillance system, for accumulating call associated data for lawfully authorized surveillance of a subject's communications through a telephone network, the surveillance system comprising:

monitors coupled to common channel signaling links of the telephone network for monitoring interoffice signaling messages;

a common channel signaling processor in communication with the monitors, for processing the monitored messages to compile call detail records for a group of calls associated with the subject that involve interoffice signaling;

software in one switching system of the network providing service to the subject, for causing the switching system to generate accounting messages regarding events in processing of a predetermined set of calls for the subject through the one switching system, the predetermined set of calls consisting essentially of calls not involving interoffice signaling messages detectable by the monitors;

a data system for receiving and processing the accounting messages from the one switching office to form a detailed surveillance record of call processing data relating to each of the calls in the predetermined set;

a server for receiving and processing the call detail records for the group of calls and the detailed records for the predetermined set of calls and producing surveillance records of both the group of calls and the predetermined set of calls; and a data link from the server for delivering the surveillance records to a data processing system of a law enforcement agency.

17. A surveillance system as in claim 16, wherein the server comprises:

means for translating items of information from the call detail records for the group of calls and from the detailed records for the predetermined set of calls into corresponding descriptive information; and means for formatting data from the call detail records for the group of calls and the detailed records for the predetermined set of calls together with the descriptive information into the surveillance records.

18. A surveillance system, for accumulating call associated data for lawfully authorized surveillance of a subject's communications through a telephone network, the surveillance system comprising:

monitors coupled to common channel signaling links of the telephone network for monitoring interoffice signaling messages;

a common channel signaling processor in communication with the monitors, for processing the monitored messages to compile call detail records for a group of calls associated with the subject that involve interoffice signaling;

software in one switching system of the network providing service to the subject, for causing the switching system to generate accounting messages regarding events in processing of a predetermined set of calls for the subject through the one switching system, the predetermined set of calls consisting essentially of calls not involving interoffice signaling messages detectable by the monitors, wherein the predetermined set of calls comprises intra-office calls processed by the one switching system;

a server for receiving and processing the call detail records from the common channel signaling processor and detailed records for the predetermined set of calls containing data from the accounting messages and producing surveillance records of the group of calls and the predetermined set of calls; and a data link from the server for delivering the surveillance records to a data processing system of a law enforcement agency.

19. A surveillance system, for accumulating call associated data for lawfully authorized surveillance of a subject's communications through a telephone network, the surveillance system comprising:

monitors coupled to common channel signaling links of the telephone network for monitoring interoffice signaling messages;

a common channel signaling processor in communication with the monitors, for processing the monitored messages to compile call detail records for a group of calls associated with the subject that involve interoffice signaling;

software in one switching system of the network providing service to the subject, for causing the switching system to generate accounting messages regarding events in processing of a predetermined set of calls for the subject through the one switching system, the predetermined set of calls consisting essentially of calls not involving interoffice signaling messages detectable by the monitors, wherein the predetermined set of calls comprises calls for control of special service features provided by the one switching system;

a server for receiving and processing the call detail records from the common channel signaling processor and detailed records for the predetermined set of calls containing data from the accounting messages and producing surveillance records of the group of calls and the predetermined set of calls; and a data link from the server for delivering the surveillance records to a data processing system of a law enforcement agency.

20. A surveillance system, for accumulating call associated data for lawfully authorized surveillance of a subject's communications through a telephone network, the surveillance system comprising:

monitors coupled to common channel signaling links of the telephone network for monitoring interoffice signaling messages;

a common channel signaling processor in communication with the monitors, for processing the monitored messages to compile call detail records for a group of calls associated with the subject that involve interoffice signaling;

software in one switching system of the network providing service to the subject, for causing the switching system to generate accounting messages regarding events in processing of a predetermined set of calls for the subject through the one switching system, the predetermined set of calls consisting essentially of calls not involving interoffice signaling messages detectable by the monitors, wherein the predetermined set of calls comprises inter-office calls not involving the monitored common channel signaling;

a server for receiving and processing the call detail records from the common channel signaling processor and detailed records for the predetermined set of calls containing data from the accounting messages and producing surveillance records of the group of calls and the predetermined set of calls; and a data link from the server for delivering the surveillance records to a data processing system of a law enforcement agency.

21. A surveillance system as in claim 20, wherein the inter-office calls not involving the monitored common channel signaling comprise interoffice calls processed through a switching system of the telephone network using in-band interoffice signaling.

22. A surveillance system as in claim 16, wherein the software comprises a code relating to surveillance, and the code is included in a subscriber profile utilized by the one switching system during processing of calls for the subject.

* * * * *